UNITED STATES PATENT OFFICE 2,324,492

PROCESS FOR BREAKING PETROLEUM EMULSIONS

Melvin De Groote, University City, and Bernhard Keiser, Webster Groves, Mo., assignors to Petrolite Corporation, Ltd., Wilmington, Del., a corporation of Delaware No Drawing. Application July 7, 1941, Serial No. 401,380

10 Claims. (Cl. 252—341)

This invention relates primarily to the resolution of petroleum emulsions.

One object of our invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

The new chemical compound or composition of matter herein described that is used as the demulsifying agent of our process, is exemplified by the acidic, or preferably, neutral ester derived by complete esterification of one mole of a polyalkylene glycol of the kind hereinafter described, with two moles of a fractional ester derived from a hydroxylated material of the kind herein described, and a polybasic carboxy acid having not over six carbon atoms.

If a hydroxylated material, indicated for the sake of convenience by the formula T.OH, is reacted with a polybasic carboxy acid of the dibasic type, which, similarly, may conveniently be indicated by the formula HOOC.D.COOH, then the fractional ester obtained by reaction between equimolar quantities may be indicated by the following formula:

$$\text{HOOC.D.COO.T}$$

The polyethylene glycol may be characterized by materials of the kind such as heptaethylene glycol, octaethylene glycol, nonaethylene glycol, decaethylene glycol, to and including heptadecaethylene glycol. For convenience these polyethylene glycols may be indicated by the following formula:

$$\text{OH}(C_2H_4O)_m\text{H}$$

in which $m$ varies from 7 through 17.

Instead of polyethylene glycols, one may use polypropylene glycols or polybutylene glycols. Thus, for convenience, in the broadest aspect, the polyalkylene glycols employed may be indicated by the following formula:

$$\text{OH}(C_nH_{2n}O)_m\text{H}$$

in which $m$ has its previous significance, and $n$ represents a numeral varying from 2 to 4.

Thus, the bulk of the materials herein contemplated may be indicated within certain variations, as hereinafter stated, by the neutral ester derived by esterification of one mole of a glycol of the kind above described, with two moles of a fractional ester of the kind previously described. The formation of the compound may be indicated by the following reaction, although obviously, it is immaterial what particular procedure is employed to produce the particular chemical compound or product:

$$\text{T.OOC.D.COOH} + \text{OH}(C_2H_4O)_m\text{H} + \text{HOOC.D.COO.T} \rightarrow$$
$$\text{T.OOC.D.COO}(C_2H_4O)_{m-1}C_2H_4.\text{OOC.D.COO.T}$$

As indicated previously, the polybasic acids employed are limited to the type having not more than six carbon atoms, for example, oxalic, malonic, succinic, glutaric, and adipic. Similarly, one may employ acids such as fumaric, maleic, glutaconic, and various others, including citric, malic, tartaric, and the like. The selection of the particular tribasic or dibasic acid employed is usually concerned, largely, with convenience of manufacture of the finished ester, and also of the price of the reactants. Generally speaking, the higher the temperature employed, the easier it is to obtain large yields of the esterified product. Although oxalic acid is comparatively cheap, it decomposes somewhat readily at slightly above the boiling point of water. For this reason, it is more desirable to use an acid which is more resistant to pyrolysis. Similarly, when a polybasic acid is available in the form of an anhydride, such anhydride is apt to produce the ester with greater ease than the acid itself. For this reason, maleic anhydride is particularly adaptable; and also, everything else considered, the cost is comparatively low on a per molar basis, even though somewhat higher on a per pound basis. Succinic acid or the anhydride has many of the attractive qualities of maleic anhydride; and this is also true of adipic acid. For purposes of brevity, the bulk of the compounds hereinafter illustrated will refer to the use of maleic anhydride, although it is understood that any other suitable polybasic acid may be employed. Furthermore, for purposes of convenience, reference is made to the use of polyethylene glycols. As has been previously indicated, such glycols can be replaced by suitable polypropylene or polybutylene compounds.

As far as the range of oxyalkylated compounds employed as reactants is concerned, it is our preference to employ those having approximately 8–12 oxyalkylene groups, particularly 8–12 oxyethylene groups. The preference to use the oxyethylated compounds is due, largely, to the fact that they are commercially available, and particularly so in two desirable forms. The most desirable form is the so-called nonaethylene glycol, which, although consisting largely of nonaethylene glycol, may contain small amounts of heptaethylene and octaethylene glycols, and possibly minor percentages of the higher homologs. Such glycols represent the upper range of distillable glycols; and they may be conveniently referred to as "upper distillable ethylene glycols." There is no particularly good procedure for making a sharper separation on a commercial scale; and it is understood that mixtures of one or more of the glycols may be employed, as well as a single glycol. As pointed out, it is particularly preferred to employ nonaethylene glycol as commercially available, although it is understood that this product contains other homologs, as indicated.

Substantially as desirable as the upper distillable polyethylene glycols, are the lower non-distillable polyethylene glycols. These materials are available in the form of a waxy water-soluble material, and the general range may vary somewhat from deca- to tetradecaethylene glycol. As is well understood, the method of producing such glycols would cause some higher homologs to be formed; and thus, even in this instance, there may be present some oxyethylene glycols within the higher range above indicated. One need not point out that these particular compounds consist of mixtures, and that in some instances, particularly desirable esters are obtained by making mixtures of the liquid nonaethylene glycol with the soft, waxy, lower non-distillable polyethylene glycols. For the sake of convenience, reference in the examples will be to nonaethylene glycol; and calculations will be based on a theoretical molecular weight of 414. Actually, in manufacture the molecular weight of the glycol employed, whether a higher distillable polyethylene glycol, or a lower non-distillable polyethylene glycol, or a mixture of the same, should be determined and reaction conducted on the basis of such determination, particularly in conjunction with the hydroxyl or acetyl value.

It has been previously pointed out that it is immaterial how the compounds herein contemplated are manufactured, although we have found it most desirable to react the selected glycol or mixtures of glycols with maleic anhydride in a ratio of two moles of the anhydride for one mole of the glycol. Under such circumstances, we have found little tendency to form longer chain polymers; and in fact, the product of reaction, if conducted at reasonably low temperatures, appears to be largely monomeric. For convenience, such intermediate product may then be considered as a dibasic or polybasic acid. One mole of the intermediate so obtained is then reacted with two moles of the alcoholic material of the kind subsequently described.

It is to be noted, however, that if one prepares a fractional acidic ester, then if two moles of the fractional acidic ester are reacted with one mole of the polyethylene glycol, there is no possibility for the formation of polymeric types of esterification products under ordinary conditions.

The alcoholic bodies employed as reactants in one mode of manufacture of the present compounds, are hydroxylated substituted pyridinium halides or other compounds in which there is present an anion functionally equivalent to the halide amine, i. e., an anionic functional equivalent to the chloride or bromide ion. There is a large variety of such compounds available, and they are characterized by the fact that the group substituted for the hydrogen atom of the pyridinium radical

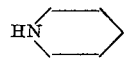

contains in excess of 7 carbon atoms, as, for example, when derived from one mole of triricinolein, as subsequently described, it may have present as many as 9 carbon atoms. Generally speaking, the range of 10–30 carbon atoms represents the most desirable type of reactant to be employed. The hydroxyl radical may be present as part of a hydroxy hydrocarbon radical, or it may be present as the part of an acyl radical. For instance, it may be present as part of a ricinoleyl radical, or similar radical, derived from hydroxystearic acid or the like.

In order to illustrate suitable quaternary reactants of the type above described, reference is made to the following examples. It is to be noted that this list is by no means exhaustive.

INTERMEDIATE REACTANT

*Example 1*

500 g. of a fatty acid ethanolamide, obtained by reaction of split cocoanut oil (containing all the natural acids, beginning with the caprylic up to the stearic acid, and some oleic acid) with monoethanolamine, 330 g. hydrochloride of a fraction of pyridine bases (50% distilling up to 140° C., 90% distilling up to 160°, completely soluble in water) and 100 g. of the mixture of the free pyridine bases, are heated at 100° C. until the product is, for the most part, soluble in water and stable towards diluted sodium carbonate solution. After being separated from the primary compounds not reacted upon, the mixture of pyridinium-, picolinium- and other homologous pyridinium compounds obtained, may be further worked up to form a 10% watery solution.

When working at 150–160°, the reaction is more rapid.

Furthermore, pure pyridine may be used instead of a mixture of pyridine bases.

(Compare with Example 2 of the Haack Patent No. 2,242,211.)

INTERMEDIATE REACTANT

*Example 2*

Hydroxyethyl ricinoleoamide derived by reaction between ricinoleic acid and monoethanolamine is substituted for the amide employed in Example 1, preceding.

INTERMEDIATE REACTANT

*Example 3*

A drastically oxidized castor oil having approximately the following characteristics:

| | |
|---|---|
| Acid number | 13.2 to 25.0 |
| Saponification number | 230.5 to 274.0 |
| Iodine number | 43.5 to 55.0 |
| Acetyl number | 164.0 to 192.0 |
| Hydroxyl value | 188.0 to 220.0 |
| Percent unsaponifiable matter | 1.1 |
| Percent nitrogen | 0.0 |
| Percent $SO_3$ | 0.0 |
| Percent ash | Trace | is converted into the hydroxyethyl amide by reaction with monoethanolamine. Such amide is substituted for the amide employed in Example 1, preceding.

INTERMEDIATE REACTANT

*Example 4*

One pound mole of castor oil is treated with three pound moles of ethylene oxide in the presence of one-half of 1% of sodium ricinoleate as a catalyst at a temperature of 100–200° C. at a gauge pressure of 100 pounds and less than 300 pounds, so as to produce an oxyethylated triricinolein. Such material is converted into the hydroxyethyl amide by reaction with monoethanolamine. Such amide is employed instead of the amide described in Example 1, preceding.

INTERMEDIATE REACTANT

*Example 5*

Phenylstearic acid is prepared in any suitable manner, as, for example, in the manner described in U. S. Patent No. 2,081,075, dated May 18, 1937, to Vobach. This is converted into phenylstearic hydroxy ethyl amide, and such amide employed in the manner described in Example 1, preceding.

The manufacture of the above compounds is usually conducted with an excess of the pyridinium base halide, such as the hydrochloride or hydrobromide, and usually in the presence of a significant amount of the free pyridinium base itself. In many instances, however, there is no need to use an excess of the pyridinium base halide, and in fact, no need to have present any of the free pyridinium base itself, or at the most, only a trace of the free base. The above 5 examples are substantially as they appear, numbered "Examples 1 through 5," in our application Serial No. 401,375 filed July 7, 1941, now U. S. Patent No. 2,273,181, dated February 17, 1942.

INTERMEDIATE REACTANT

*Example 6*

8 parts of chloracetyl chloride were added slowly to 20 parts of castor oil, while stirring. After the first vigorous reaction had subsided, the mixture was placed under a reflux condenser and was stirred and heated on a steam plate for 6 hours. The evolved HCl gas was then swept out with dry air. Then 6 parts of pyridine were added to the mixture, which was thereupon warmed while stirring for a period of four hours. The product was a red, viscous oil which was nearly solid at room temperature. In water it formed a clear, viscous solution of low surface tension. The product was not precipitated from solution by alkali, alkaline earth-, or heavy metal salts.

INTERMEDIATE REACTANT

*Example 7*

12 parts of chloracetyl chloride were added with stirring to 90 parts of castor oil. The mixture was warmed on the steam plate for 14 hours, purged of HCl with dry air, and then mixed with 8 parts of pyridine. This mixture was left on the steam plate over night. The product was a dark red oil, dispersible in water, and soluble in xylene. At least a predominant portion of this material consisted of a quaternary ammonium salt having the formula:

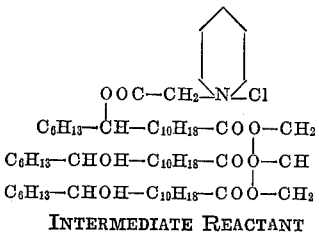

INTERMEDIATE REACTANT

*Example 8*

Bis(hydroxyethyl) ricinoleoamide is substituted for castor oil in the preceding example so as to give a suitable monopyridinium derivative.

INTERMEDIATE REACTANT

*Example 9*

Monoricinolein is substituted for castor oil in Intermediate reactant, Example 7, preceding, so as to yield the monopyridinium derivative.

INTERMEDIATE REACTANT

*Example 10*

Diricinolein is substituted for monoricinolein in the preceding example.

INTERMEDIATE REACTANT

*Example 11*

The ricinoleoamide derived from tris(hydroxymethyl) aminomethane is substituted for bis-(hydroxyethyl) ricinoleoamide in Intermediate reactant, Example 8, preceding.

INTERMEDIATE REACTANT

*Example 12*

The neutral ester derived by esterifying one part of diethylene glycol with 2 parts of ricinoleic acid, is substituted for castor oil in Intermediate reactant, Example 7, preceding, so as to yield the monopyridinium derivative.

INTERMEDIATE REACTANT

*Example 13*

Mannitan mono-oleate is substituted for castor oil in Intermediate reactant, Example 7, so as to obtain the monopyridinium derivative.

INTERMEDIATE REACTANT

*Example 14*

Ricinoleic acid or an ester thereof such as ethyl ricinoleate is reduced to give the corresponding diol, i. e., a dihydroxy octadecane. Such diol is substituted for castor oil in Intermediate reactant, Example 7, preceding, so as to obtain the corresponding monopyridinium derivative. Similarly, instead of dihydroxy octadecane, dihydroxy octane, dihydroxy decane, or dihydroxy tetradecane may be employed.

INTERMEDIATE REACTANT

*Example 15*

Phenol is reacted with acetone (or diethyl ketone or methyl ethyl ketone), as described in U. S. Patent No. 1,225,748, to Wallace A. Beatty, to give the compound diphenylol methane,

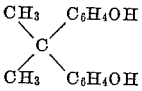

(or the corresponding diethyl or methyl ethyl compound). This compound is hydrogenated as described in British Patent No. 274,439, to give the corresponding dicyclohexylol dialkyl methane. The product so obtained may be conveniently considered as a diol and substituted in place of the diol used as a reactant in Intermediate reactant, Example 14, preceding.

Preceding Examples 6 and 7 are substantially as they appear in the application of Charles M. Blair, Jr., Serial No. 353,127, filed August 17, 1940 now U. S. Patent No. 2,306,775, dated December 29, 1942, as Examples 1 and 2. Compare Intermediate reactant, Examples 8–15, inclusive, with Intermediate reactant, Examples 6 and 7. Note also that a somewhat similar reactant, which may be employed in the manufacture of intermediates by the same procedure, is obtained by reacting two moles of ricinoleic acid with one mole of ethylene diamine, or one mole of ricinoleic acid with one mole of hydroxyethyl ethylene diamine to give an amide.

INTERMEDIATE REACTANT

*Example 16*

The procedure described in the aforementioned Blair Patent No. 2,306,775 is followed so as to give a chemical compound analogous to the one depicted by structural formula in Intermediate reactant, Example 7, preceding, except that sufficient chloracetyl chloride, and likewise, sufficient pyridine, is employed so that a dipyridinium compound is obtained.

INTERMEDIATE REACTANT

*Example 17*

12 parts of ricinoleo-hydroxymethylamide, 8 parts of anhydrous pyridine hydrochloride, and 20 parts of pyridine are stirred together at 70–80° C. until a test sample of the reaction mixture dissolves in water to give clear solutions. The reaction mixture is then distilled at 60–70° C. under reduced pressure to remove pyridine. Acetone is then added to the distillation residue, which is a viscous mass, whereby the new quaternary salt is precipitated in the form of white needles. The new quaternary salt, ricinoleomethyl pyridinium chloride, thus obtained when purified, if necessary, by recrystallization from acetone, gives analyses corresponding to the formula $$C_{17}H_{32}OH-CO-NH-CN_2-N\diagup\diagdown\diagup Cl$$

The new quaternary salt is readily soluble in warm water to give clear foaming solutions.

(Compare with Example 2 of U. S. Patent No. 2,146,392, dated February 7, 1939, to Baldwin and Walker.)

INTERMEDIATE REACTANT

*Example 18*

U. S. Patent No. 2,146,408, dated February 7, 1939, to Shipp, discloses compounds of the following type formula:

$$R-CONH-CH_2-N-O.CO.CH_3$$

Obviously, a compound of the above type or a suitable variant thereof may have present an alcohol hydroxyl group. For instance, R may be derived from ricinoleic acid. Such compound may be treated with ethylene oxide so as to convert the amino hydrogen atom into a hydroxyethyl group.

INTERMEDIATE REACTANT

*Example 19*

U. S. Patent No. 2,202,328, to Albrecht, dated May 19, 1940, discloses compounds of the following type:

$$CH_3-(CH_2)_9-\overset{H}{\underset{}{C}}-\overset{O}{\underset{}{C}}-N\diagup\diagdown\overset{H}{\underset{C_6H_5}{}}$$

(with N—halogen pyridine ring)

The same sort of procedure enumerated in the preceding example may be used to assure the presence of an alcoholic hydroxyl group.

INTERMEDIATE REACTANT

*Example 20*

Compounds are obtained comparable to those described in Examples 1–5, inclusive, by use of diethanolamine, instead of monoethanolamine for the production of amide or by oxyethylation or oxyalkylation of the completed product derived from monoethanolamine, whereby an amino hydrogen atom is converted into a hydroxyethyl group.

INTERMEDIATE REACTANT

*Example 21*

An esterified hydroxy tertiaryamine, such as ethyl diethanolamine or triethanolamine, as exemplified by the following formula:

$$\begin{matrix} RCOC_2H_4\diagdown \\ OHC_2H_4-N \\ OHC_2H_4\diagup \end{matrix}$$

in which RCO is a fatty acid radical, such as the oleic acid radical or ricinoleic acid radical, is substituted for the hydroxylated amide in the type of material exemplified by Examples 1–5, preceding.

INTERMEDIATE REACTANT

*Example 22*

An esterified polyamine of the following formula type:

$$\begin{matrix} RCOC_2H_4\diagdown & & \diagup C_2H_4OH \\ & NC_2H_4OC_2H_4N & \\ OHC_2H_4\diagup & & \diagdown C_2H_4OH \end{matrix}$$

is substituted for the somewhat analogous monoamino reactant of the preceding example.

INTERMEDIATE REACTANT

*Example 23*

As to other substituted pyridinium type compounds which may serve as reactants in the manufacture of the compounds of the kind herein contemplated, reference is made to the following: U. S. Patent No. 2,189,397, February 6, 1940, to Harris; 2,189,664, February 6, 1940, to Katzman; 2,190,133, February 13, 1940, to Epstein et al.; 2,213,979, September 10, 1940, to Epstein et al.; and 2,217,683, October 15, 1940, to Katzman.

INTERMEDIATE REACTANT

*Example 24*

A high molal amine, for instance, the amine derived by converting oleic acid, stearic acid, ricinoleic acid, lauric acid, and the like, into the corresponding amide, and then reducing to the nitrile and then further reducing to the amine, is treated with an oxyalkylating agent, such as ethylene oxide, to give a product such as hydroxyethyl dodecylamine, or bis(hydroxyethyl) dodecylamine. Such products are then treated with pyridinium hydrochloride or the equivalent in the manner contemplated in Intermediate reactant, Examples 1–5, preceding, so as to yield a hydroxylated compound.

INTERMEDIATE REACTANT

*Example 25*

The ricinoleic acid amide derived by reaction between ricinoleic acid and tris(hydroxymethyl)aminomethane is reacted with pyridine hydrochloride in the manner illustrated by Intermediate reactant, Examples 1–5, preceding.

INTERMEDIATE REACTANT

*Example 26*

2-amino-2-methyl-1-propanol is reacted with ricinoleic acid and the amide so obtained reacted with pyridine hydrochloride in the manner exemplified by Intermediate reactant, Examples 1–5, preceding.

Similar reactants include the following: 2-amino-1-butanol; 2-amino-2-methyl-1,3-propane diol; 2-amino-2-ethyl-1,3-propane diol; 1-3-diamino propanol. Such materials may not only be combined with ricinoleic acid; but in such instances where there is more than one available hydroxyl radical after completion of the intermediate, one may use oleic or naphthenic acid or the like to introduce a high molal acyl group. It is to be noted that some of the pyridinium compounds above described as reactants represent new compositions or compounds. Similarly, analogous materials so derived that there is no residual alcoholic hydroxyl, also represent new types of materials.

Having obtained hydroxylated substituted pyridinium compounds of the kind previously described, the next step, of course, is to obtain fractional esters derived from nonaethylene glycol of the kind described in the earlier part of the present disclosure. Such materials may be illustrated by the following examples:

GLYCOL ESTER INTERMEDIATE PRODUCT

*Example 1*

One pound mole of nonaethylene glycol is treated with two pound moles of maleic anhydride, so as to form nonaethylene glycol dihydrogen dimaleate.

GLYCOL ESTER INTERMEDIATE PRODUCT

*Example 2*

A mixture of lower non-distillable polyethylene glycols, representing approximately deca- to tetradecaethylene glycol, is substituted for nonaethylene glycol in the preceding example.

GLYCOL ESTER INTERMEDIATE PRODUCT

*Example 3*

A 50–50 mixture of nonaethylene glycol and lower non-distillable polyethylene glycols of the kind described in the previous example is substituted for nonaethylene glycol in Example 1.

GLYCOL ESTER INTERMEDIATE PRODUCT

*Example 4*

Adipic acid is substituted for maleic anhydride in Examples 1–3, preceding.

GLYCOL ESTER INTERMEDIATE PRODUCT

*Example 5*

Oxalic acid is substituted for maleic anhydride in Examples 1–3, preceding.

GLYCOL ESTER INTERMEDIATE PRODUCT

*Example 6*

Citric acid is substituted for maleic anhydride in Examples 1–3, preceding.

GLYCOL ESTER INTERMEDIATE PRODUCT

*Example 7*

Succinic anhydride is substituted for maleic anhydride in Examples 1–3, preceding.

The method of producing such fractional esters is well known. The general procedure is to employ a temperature above the boiling point of water and below the pyrolytic point of the reactants. The products are mixed and stirred constantly during the heating and esterification step. If desired, an inert gas, such as dried nitrogen, or dried carbon dioxide, may be passed through the mixture. Sometimes it is desirable to add an esterification catalyst, such as sulfuric acid, benzene sulfonic acid, or the like. This is the same general procedure as employed in the manufacture of ethylene glycol dihydrogen diphthalate. See U. S. Patent No. 2,075,107, dated March 30, 1937, to Frasier.

Sometimes esterification is conducted most readily in the presence of an inert solvent that carries away the water of esterification which may be formed, although, as is readily appreciated, such water of esterification is absent when the reaction involves an acid anhydride, such as maleic anhydride, and a glycol. However, if water is formed, for instance, when citric acid is employed, then a solvent such as xylene may be present and employed to carry off the water formed. The mixture of xylene vapors and water vapors can be condensed so that the water is separated. The xylene is then returned to the reaction vessel for further circulation. This is a conventional and well-known procedure and requires no further elaboration.

COMPOSITION OF MATTER

*Example 1*

2 pound moles of a hydroxylated pyridinium compound of the kind exemplified by Intermediate reactant product, Example 2, preceding, are reacted with 1 pound mole of a glycol ester intermediate product of the kind described under Glycol ester intermediate products, Examples 1, 2 and 3, preceding. Such reaction is continued until substantially all carboxyl acidity has disappeared. The time of reaction may vary from a few hours to as many as 20 hours.

COMPOSITION OF MATTER

*Example 2*

The same procedure is followed as in Composition of matter, Example 1, preceding, except that the alcoholic body employed, instead of being the type exemplified by Intermediate re-

COMPOSITION OF MATTER

Example 3

The same procedure is followed as in Composition of matter, Example 1, preceding, except that Intermediate reactant, Example 6, is employed instead of Intermediate reactant, Example 2.

COMPOSITION OF MATTER

Example 4

The same procedure is followed as in Composition of matter, Example 1, except that Intermediate reactant, Example 8, is employed instead of Intermediate reactant, Example 2.

COMPOSITION OF MATTER

Example 5

The same procedure is followed as in Composition of matter, Example 1, except that Intermediate reactant, Example 17, is substituted for Intermediate reactant, Example 2.

COMPOSITION OF MATTER

Example 6

The same procedure is followed as in Composition of matter, Example 1, except that Intermediate reactant, Example 18 is substituted for Intermediate reactant, Example 2.

COMPOSITION OF MATTER

Example 7

The same procedure is followed as in Composition of matter, Example 1, except that Intermediate reactant, Example 19, is substituted for Intermediate reactant, Example 2.

COMPOSITION OF MATTER

Example 8

The same procedure is followed as in Composition of matter, Example 1, except that Intermediate reactant, Example 20, is substituted for Intermediate reactant, Example 2.

COMPOSITION OF MATTER

Example 9

The same procedure is followed as in Composition of matter, Example 1, except that Intermediate reactant, Example 21, is substituted for Intermediate reactant, Example 2.

COMPOSITION OF MATTER

Example 10

The same procedure is followed as in Composition of matter, Example 1, except that Intermediate reactant, Example 22, is substituted for Intermediate reactant, Example 2.

COMPOSITION OF MATTER

Example 11

Glycol ester intermediate products exemplified by Examples 4–7, preceding, are substituted for Glycol intermediate products, Examples 1, 2 and 3, in the preceding 10 examples.

In esterifying hydroxylated pyridinium compounds of the kind described, it is to be noted that some show rather marked resistance to decomposition by the action of heat. For instance, they may be comparatively resistant at a temperature of 160° C., or even 180° C. Others may show decomposition at lower temperatures, for instance, 120° C. In any event, esterification must be conducted at a suitable temperature so as to prevent decomposition in the instances of such compounds that are more readily susceptible to pyrolysis.

It is to be noted that this second step is an esterification reaction, and the same procedure is employed as suggested above in the preparation of the intermediate product. Needless to say, any particular method may be used to produce the desired compounds of the kind indicated. In some instances it may be desirable to conduct the esterification reaction in the presence of a non-volatile inert solvent which simply acts as a diluent or viscosity reducer.

In the preceding examples, attention has been directed primarily to the monomeric form, or at least to the form in which the bifunctional alcohol, i. e., a glycol, and the polyfunctional acid, usually a bifunctional compound, react to give a chain type compound, in which the adjacent acid and glycol nucleus occur as a structural unit. For instance, in the monomeric form this may be indicated in the following manner:

acid . . . . glycol . . . . acid

If, however, one prepared an intermediate product employing the ratio of three moles of maleic anhydride and two moles of nonaethylene glycol, the tendency would be to produce a product which might be indicated in the following manner:

acid . . . glycol . . . acid . . . glycol . . . acid

Similarly, three moles of the glycol and four moles of the acid might tend to give a combination which may be indicated thus:

acid . . . glycol . . . acid . . . glycol . . .
                        acid . . . glycol . . . acid Another way of stating the matter is that the composition may be indicated in the following manner:

$$TOOC.D.COO[(C_2H_4O)_{m-1}C_2H_4OOC.D.COO]_xT$$

in which the characters have their previous significance and $x$ is a relatively small whole number less than 10 and probably less than 5; and in the monomeric form $x$, of course, is 1. The limitations on the size of $x$ are probably influenced largely by the fact that reaction leading to further growth is dependent upon random contact.

Some of the products are self-emulsifiable oils, or self-emulsifiable compounds; whereas, others give cloudy solutions or sols; and the most desirable type is characterized by giving a clear solution in water, and usually in the presence of soluble calcium or magnesium salts, and frequently, in the presence of significant amounts of either acids or alkalies.

Water solubility can be enhanced in a number of ways which have been suggested by previous manufacturing directions, for instance:

(a) By using a more highly polymerized ethylene glycol;

(b) By using a polymeric form instead of a monomeric form in regard to the unit which forms the chain between the two alcoholic nuclei;

(c) By using a polybasic carboxy acid of lower molecular weight, for instance, maleic acid instead of adipic acid; and (d) By using a substituted pyridinium derivative of lower molecular weight, or one having one or more ether linkages, or one or more free hydroxyl groups, or an additional basic amino nitrogen atom.

Indeed, in many instances, and in fact, in practically all instances, the substituted pyridinium compound employed as a reactant prior to esterification is perfectly water-soluble. In some instances the product, if not completely water-soluble, is still self-emulsifiable. Thus, it is to be noted that in this instance one is not limited to hydroxylated materials which are water-insoluble prior to reaction with a glycol ester, but they are, in fact, almost invariably clearly water-soluble.

Actually, a reaction involving an alcohol and an acid (esterification) may permit small amounts of either one or both of the reactants, depending upon the predetermined proportion, to remain in an unreacted state. In the actual preparation of compositions of the kind herein contemplated, any residual acidity can be removed by any suitable base, for instance, ammonia, triethanolamine, or the like, especially in dilute solution. Naturally, precaution should be taken, so that neutralization takes place without saponification or decomposition of the ester. In some cases there is no objection to the presence of the acidic group. Indeed, if a tribasic acid be employed in such a manner as to leave one free carboxyl group, then it is usually desirable to neutralize such group by means of a suitable basic material.

In the heretofore appended claims, reference to a neutral product refers to one in which free carboxylic radicals are absent.

Conventional demulsifying agents employed in the treatment of oil field emulsions are used as such, or after dilution with any suitable solvent, such as water; petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials herein described may be admixed with one or more of the solvents customarily used in connection with conventional demulsifying agents, provided that such compounds are compatible. They will be compatible with the hydrophile type of solvent in all instances. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials herein described, except that they are invariably water-soluble.

We desire to point out that the superiority of the reagent or demulsifying agent contemplated in our herein described process for breaking petroleum emulsions, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practising our improved process for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure, being used either alone or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible, when the demulsifier is used in connection with acidification of calcareous oil-bearing strata, especially if suspended in or dissolved in the acid employed for acidification.

It will be apparent to those skilled in the art that residual carboxyl acidity can be eliminated by esterification with a low molal alcohol, for instance, ethyl, methyl, or propyl alcohol, by conventional procedure, so as to give a substantially neutral product. The introduction of such low molal hydrophobe groups does not seriously affect the solubility, and in some instances, gives increased resistance, to soluble calcium and magnesium salts, for such property is of particular value. Usually, however, neutralization with a dilute solution of ammonia or the like is just as practicable and less expensive.

Attention is again directed to our aforementioned Patent No. 2,273,181, and particularly to what is said in the last few paragraphs of the specification of said patent in regard to certain new compounds. Such compounds, wherein the pyridinium nitrogen atom is linked to a secondary carbon atom, may be employed, if hydroxylated, as reactants for the manufacture of the instant compositions.

In the hereto appended claims, it is intended that the monomeric forms contemplate also the polymeric forms, insofar that the polymeric forms are nothing more or less than a repetition of the monomeric forms several times over, with the loss of one or more moles of water.

Having thus described our invention, what we claim as new and desire to secure by Letters Patent is:

1. A process for breaking petroleum emulsions of the water-in-oil type, characterized by subjecting the emulsion to the action of a demulsifying agent comprising a water-soluble esterification product, derived by reaction between one mole of a polybasic compound and two moles of a hydroxylated substituted pyridinium halogen compound; the polybasic compound being the esterification product of (A) a polyalkylene glycol having at least 7 and not more than 17 ether linkages, and the alkylene radical thereof containing at least 2 and not more than 6 carbon atoms; and (B) a polybasic carboxy acid having not more than 6 carbon atoms; and the ratio of the esterifying reactants being within the range of more than 1 and not over 2 moles of the polybasic acid for each mole of the glycol; said hydroxylated substituted pyridinium halogen compound containing as a substituent for the pyridinium hydrogen atom, a radical containing at least 8 and not more than 59 carbon atoms, and having as an integral part thereof at least one alcoholiform hydroxyl radical.

2. A process for breaking petroleum emulsions of the water-in-oil type, characterized by subjecting the emulsion to the action of a demulsifying agent comprising a neutral, water-soluble esterification product, derived by reaction between one mole of a polybasic compound and two moles of a hydroxylated substituted pyridinium halogen compound, the polybasic compound being the esterification product of (A) a polyalkylene glycol having at least 7 and not more than 17 ether linkages, and the alkylene radical thereof containing at least 2 and not more than 6 carbon atoms; and (B) a polybasic carboxy acid having not more than 6 carbon atoms; and the ratio of the esterifying reactants being within the range of more than 1 and not over 2 moles of the polybasic acid for each mole of the glycol; said hydroxylated substituted pyridinium halogen compound containing as a substituent for the pyridinium hydrogen atom, a radical containing at least 8 and not more than 59 carbon atoms, and having as an integral part thereof at least one alcoholiform hydroxyl radical.

3. A process for breaking petroleum emulsions of the water-in-oil type, characterized by subjecting the emulsion to the action of a demulsifying agent comprising a neutral, water-soluble esterification product, derived by reaction between one mole of a polybasic compound and two moles of a hydroxylated substituted pyridinium halogen compound, the polybasic compound being the esterification product of (A) a polyalkylene glycol having at least 7 and not more than 17 ether linkages; and the alkylene radical thereof containing at least 2 and not more than 6 carbon atoms; and (B) a dibasic carboxy acid having not more than 6 carbon atoms; and the ratio of the esterifying reactants being within the range of more than 1 and not over 2 moles of the polybasic acid for each mole of the glycol; said hydroxylated substituted pyridinium halogen compound containing as a substituent for the pyridinium hydrogen atom, a radical containing at least 8 and not more than 59 carbon atoms, and having as an integral thereof at least one alcoholiform hydroxyl radical.

4. A process for breaking petroleum emulsions of the water-in-oil type, characterized by subjecting the emulsion to the action of a demulsifying agent comprising a neutral, water-soluble esterification product, derived by reaction between one mole of a polybasic compound and two moles of a hydroxylated substituted pyridinium halogen compound; the polybasic compound being the esterification product of (A) a polyalkylene glycol having at least 7 and not more than 17 ether linkages, and the alkylene radical thereof containing at least 2 and not more than 4 carbon atoms; and (B) a dibasic carboxy acid having not more than 6 carbon atoms; and the ratio of the esterifying reactants being within the range of more than 1 and not over 2 moles of the polybasic acid for each mole of the glycol; said hydroxylated substituted pyridinium halogen compound containing as a substituent for the pyridinium hydrogen atom, a radical containing at least 8 and not more than 59 carbon atoms, and having as an integral part thereof at least one alcoholiform hydroxyl radical.

5. A process for breaking petroleum emulsions of the water-in-oil type, characterized by subjecting the emulsion to the action of a demulsifying agent comprising a neutral, water-soluble esterification product, derived by reaction between one mole of a dibasic compound and two moles of a hydroxylated substituted pyridinium halogen compound; the dibasic compound being the esterification product of (A) a polyethylene glycol having at least 7 and not more than 17 ether linkages; and (B) a dibasic carboxy acid having not more than 6 carbon atoms; and the ratio of the esterifying reactants being within the range of more than 1 and not over 2 moles of the dibasic acid for each mole of the glycol; said hydroxylated substituted pyridinium halogen compound containing as a substituent for the pyridinium hydrogen atom, a radical containing at least 8 and not more than 59 carbon atoms, and having as an integral part thereof at least one alcoholiform hydroxyl radical.

6. A process for breaking petroleum emulsions of the water-in-oil type, characterized by subjecting the emulsion to the action of a demulsifying agent comprising a water-soluble chemical compound of the following formula type:

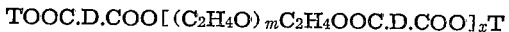

TOOC.D.COO[(C₂H₄O)ₘC₂H₄OOC.D.COO]ₓT in which T is a radical derived by the dehydroxylation of a hydroxylated substituted pyridinium halogen compound in which the substituent for the pyridinium hydrogen atom is a radical containing at least 8 and not more than 59 carbon atoms, and having as an integral part thereof at least one alcoholiform hydroxyl radical;

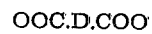

OOC.D.COO is the acid radical derived from a dibasic acid by removal of the acidic hydrogen atom; said acid radical having not over 6 carbon atoms; $m$ represents a numeral varying from 7 to 12; and $x$ is a small whole number less than 10.

7. A process for breaking petroleum emulsions of the water-in-oil type, characterized by subjecting the emulsion to the action of a demulsifying agent comprising a water-soluble chemical compound of the following formula type:

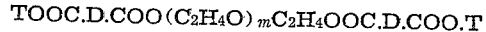

TOOC.D.COO(C₂H₄O)ₘC₂H₄OOC.D.COO.T in which T is a radical derived by the dehydroxylation of a hydroxylated substituted pyridinium halogen compound in which the substituent for the pyridinium hydrogen atom is a radical containing at least 8 and not more than 59 carbon atoms, and having as an integral part thereof at least one alcoholiform hydroxyl radical; OOC.D.COO is the acid radical derived from a dibasic acid by removal of the acidic hydrogen atoms; said acid radical having not over 6 carbon atoms; and $m$ represents a numeral varying from 7 to 12.

8. A process for breaking petroleum emulsions of the water-in-oil type, characterized by subjecting the emulsion to the action of a demulsifying agent comprising a neutral, water-soluble chemical compound of the following formula type:

TOOC.D.COO($C_2H_4O$)$_m$$C_2H_4$OOC.D.COO.T in which T is a radical derived by the dehydroxylation of a hydroxylated substituted pyridinium halogen compound in which the substituent for the pyridinium hydrogen atom is a radical containing at least 8 and not more than 59 carbon atoms, and having as an integral part thereof at least one alcoholiform hydroxyl radical; OOC.D.COO is the acid radical derived from maleic acid by removal of the acidic hydrogen atoms; said acid radical having not over 6 carbon atoms; and $m$ represents a numeral varying from 7 to 12.

9. A process for breaking petroleum emulsions of the water-in-oil type, characterized by subjecting the emulsion to the action of a demulsifying agent comprising a neutral, water-soluble chemical compound of the following formula type:

TOOC.D.COO($C_2H_4O$)$_m$$C_2H_4$OOC.D.COO.T in which T is a radical derived by the dehydroxylation of a hydroxylated substituted pyridinium halogen compound in which the substituent for the pyridinium hydrogen atom is a radical containing at least 8 and not more than 59 carbon atoms, and having as an integral part thereof at least one alcoholiform hydroxyl radical; OOC.D.COO is the acid radical derived from succinic acid by removal of the acidic hydrogen atoms; and $m$ represents a numeral varying from 7 to 12.

10. A process for breaking petroleum emulsions of the water-in-oil type, characterized by subjecting the emulsion to the action of a demulsifying agent comprising a neutral, water-soluble chemical compound of the following formula type:

TOOC.D.COO($C_2H_4O$)$_m$$C_2H_4$OOC.D.COO.T in which T is a radical derived by the dehydroxylation of a hydroxylated substituted pyridinium halogen compound in which the substituent for the pyridinium hydrogen atom is a radical containing at least 8 and not more than 59 carbon atoms, and having as an integral part thereof at least one alcoholiform hydroxyl radical; OOC.D.COO is the acid radical derived from adipic acid by removal of the acidic hydrogen atoms; and $m$ represents a numeral varying from 7 to 12.

MELVIN DE GROOTE.
BERNHARD KEISER.